United States Patent
Donato et al.

(10) Patent No.: US 11,927,193 B2
(45) Date of Patent: Mar. 12, 2024

(54) MULTI-STAGE COMPRESSOR WITH TURBINE SECTION FOR FUEL CELL SYSTEM

(71) Applicant: Garrett Transportation I Inc., Torrance, CA (US)

(72) Inventors: Brent Donato, Torrance, CA (US); Jeffrey Allen Lotterman, Moravia (CZ); Ryoken Matsuzaki, Torrance, CA (US)

(73) Assignee: GARRETT TRANSPORTATION I INC, Torrance, CA (US)

( * ) Notice: Subject to any disclaimer, the term of this patent is extended or adjusted under 35 U.S.C. 154(b) by 574 days.

(21) Appl. No.: 15/991,344

(22) Filed: May 29, 2018

(65) Prior Publication Data
US 2019/0145416 A1 May 16, 2019

Related U.S. Application Data

(60) Provisional application No. 62/585,667, filed on Nov. 14, 2017.

(51) Int. Cl.
*F04D 17/12* (2006.01)
*F01D 5/04* (2006.01)
(Continued)

(52) U.S. Cl.
CPC ........... *F04D 17/122* (2013.01); *F01D 5/048* (2013.01); *F02B 37/013* (2013.01); *F02B 37/10* (2013.01);
(Continued)

(58) Field of Classification Search
CPC .... F04D 17/122; F04D 25/024; F04D 25/045; F04D 25/0606; F04D 29/266;
(Continued)

(56) References Cited

U.S. PATENT DOCUMENTS 2,842,306 A * 7/1958 Buchi ................ A47B 96/1408
  417/247
3,143,103 A * 8/1964 Zuhn ..................... F02B 37/005
  60/599

(Continued)

FOREIGN PATENT DOCUMENTS

| CN | 107893772 A | 4/2018 | |
|---|---|---|---|
| EP | 3242002 A1 * | 11/2017 | ............... H02K 5/20 |
| FR | 2588612 A1 * | 4/1987 | .............. F02C 3/045 |

OTHER PUBLICATIONS

FR 2588612—Translation and original (Year: 1987).*

*Primary Examiner* — Justin D Seabe
*Assistant Examiner* — Behnoush Haghighian
(74) *Attorney, Agent, or Firm* — LORENZ & KOPF, LLP

(57) ABSTRACT

A multi-stage charging device includes a shaft that is supported for rotation about an axis. The charging device also includes a first compressor wheel of a first compressor stage. The first compressor wheel is fixed on the shaft. Furthermore, the charging device includes a second compressor wheel of a second compressor stage. The second compressor wheel is fixed on the shaft. Additionally, the charging device includes a turbine wheel of a turbine section. The turbine wheel is fixed on the shaft in a back-to-back arrangement with the second compressor wheel.

16 Claims, 3 Drawing Sheets

(51) Int. Cl.
*F02B 37/013* (2006.01)
*F02B 37/10* (2006.01)
*F02B 39/10* (2006.01)
*F02C 3/05* (2006.01)
*F02C 6/12* (2006.01)
*F04D 25/02* (2006.01)
*F04D 25/04* (2006.01)
*F04D 29/26* (2006.01)
*H01M 8/04111* (2016.01)
*F02B 33/34* (2006.01)
*F02C 3/107* (2006.01)
*F04D 25/06* (2006.01)

(52) U.S. Cl.
CPC .............. *F02B 39/10* (2013.01); *F02C 3/05* (2013.01); *F02C 6/12* (2013.01); *F04D 25/024* (2013.01); *F04D 25/045* (2013.01); *F04D 29/266* (2013.01); *H01M 8/04111* (2013.01); *F02B 33/34* (2013.01); *F02C 3/107* (2013.01); *F04D 17/12* (2013.01); *F04D 25/0606* (2013.01); *F05D 2220/40* (2013.01); *F05D 2220/76* (2013.01); *F05D 2240/40* (2013.01); *H01M 2250/20* (2013.01)

(58) Field of Classification Search
CPC ........ F01D 5/048; F02B 37/013; F02B 37/10; F02B 39/10; F02C 3/05; F02C 6/12; H01M 8/04111; F05D 2220/40; F05D 2220/76; F05D 2240/40
See application file for complete search history.

(56) References Cited

U.S. PATENT DOCUMENTS

| | | | | |
|---|---|---|---|---|
| 4,041,210 A * | 8/1977 | Van Dine | ............ | H01M 8/0643 429/415 |
| 4,260,339 A | 4/1981 | Lofts | | |
| 4,388,042 A * | 6/1983 | Weber | ............ | F01D 5/048 416/198 A |
| 5,406,796 A * | 4/1995 | Hiereth | ............ | F02B 37/164 60/605.2 |
| 6,887,609 B2 * | 5/2005 | Kaufmann | ............ | H01M 8/04089 429/433 |
| 7,723,857 B2 * | 5/2010 | Chen | ............ | F01D 3/00 290/1 A |
| 8,181,462 B2 * | 5/2012 | Arnold | ............ | F01D 5/048 60/612 |
| 8,840,359 B2 * | 9/2014 | Vick | ............ | F04D 25/04 415/1 |
| 8,925,302 B2 * | 1/2015 | Ruona | ............ | F02D 23/00 60/280 |
| 9,714,618 B2 * | 7/2017 | Byrd | ............ | F02D 41/0007 |
| 10,054,003 B2 * | 8/2018 | Eriksson | ............ | F02B 37/183 |
| 10,087,821 B2 * | 10/2018 | Oakes | ............ | F01D 25/243 |
| 10,087,939 B2 * | 10/2018 | Eckl | ............ | F02B 37/004 |
| 10,215,085 B2 * | 2/2019 | Yamashita | ............ | F02B 39/10 |
| 10,233,838 B2 * | 3/2019 | Vick | ............ | F02C 7/08 |
| 10,364,761 B2 * | 7/2019 | Sivaraman | ............ | H02K 5/18 |
| 10,422,248 B2 * | 9/2019 | Ekstrand | ............ | F02B 39/14 |
| 2004/0216445 A1 * | 11/2004 | Jones | ............ | F04D 25/16 60/226.1 |
| 2007/0077459 A1 * | 4/2007 | Walton | ............ | H01M 8/04111 429/436 |
| 2007/0122296 A1 | 5/2007 | Arnold et al. | | |
| 2010/0175377 A1 * | 7/2010 | Hippen | ............ | F02B 39/10 60/602 |
| 2012/0020771 A1 | 1/2012 | Hollman et al. | | |
| 2012/0051952 A1 * | 3/2012 | Knoop | ............ | F04D 29/057 417/365 |
| 2014/0314590 A1 * | 10/2014 | Ising | ............ | F02B 37/004 417/405 |
| 2018/0171903 A1 * | 6/2018 | Aronsson | ............ | F02M 26/16 |
| 2018/0231006 A1 * | 8/2018 | Sun | ............ | F04D 29/4206 |
| 2019/0153938 A1 * | 5/2019 | Hammoud | ............ | F02C 3/10 |

* cited by examiner

MULTI-STAGE COMPRESSOR WITH TURBINE SECTION FOR FUEL CELL SYSTEM

CROSS REFERENCE TO RELATED APPLICATION

The following claims priority to U.S. Provisional Patent Application No. 62/585,667, filed Nov. 14, 2017, the entire disclosure of which is incorporated by reference.

TECHNICAL FIELD

The present disclosure generally relates to a multi-stage compressor, and more particularly relates to a multi-stage compressor with a turbine section for a fuel cell system.

BACKGROUND

Fuel cell systems often include a charging device (i.e., a fuel cell compressor), for compressing air before it is fed to the fuel cell stack. This can increase operating efficiency of the fuel cell system.

However, conventional charging devices suffer from various deficiencies, and operating efficiency of the fuel system may suffer as a result. Also, the fuel cell compressor may be relatively bulky and/or heavy. Others may generate a significant amount of undesirable noise. Furthermore, some fuel cell compressors may be relatively expensive to manufacture.

Thus, it is desirable to provide a fuel cell compressor that improves efficiency of the fuel cell system. It is also desirable to provide a fuel cell compressor that is compact, quiet, and that is cost effective. Other desirable features and characteristics of the present disclosure will become apparent from the subsequent detailed description and the appended claims, taken in conjunction with the accompanying drawings and this background discussion.

BRIEF SUMMARY

In one embodiment, a multi-stage charging device is disclosed. The charging device includes a shaft that is supported for rotation about an axis. The charging device also includes a first compressor wheel of a first compressor stage. The first compressor wheel is fixed on the shaft. Furthermore, the charging device includes a second compressor wheel of a second compressor stage. The second compressor wheel is fixed on the shaft. Additionally, the charging device includes a turbine wheel of a turbine section. The turbine wheel is fixed on the shaft in a back-to-back arrangement with the second compressor wheel.

In another embodiment, a multi-stage charging device is disclosed. The charging device includes a shaft that is supported for rotation about an axis. Also, the charging device includes a first compressor wheel of a first compressor stage. The first compressor wheel is fixed on the shaft. Furthermore, the charging device includes a second compressor wheel of a second compressor stage. The second compressor wheel is fixed on the shaft. Also, the charging device includes a turbine wheel of a turbine section. The turbine wheel is fixed on the shaft. The turbine wheel is disposed between the first compressor wheel and the second compressor wheel along the axis.

In a further embodiment, a multi-stage charging device for a fuel cell system with a fuel cell stack is disclosed. The charging device includes a first compressor stage cooperatively defined by a first compressor wheel and a first compressor housing. The charging device also includes a motor section with a stator and a rotor. Moreover, the charging device includes a second compressor stage cooperatively defined by a second compressor wheel and a second compressor housing. Furthermore, the charging device includes a turbine section cooperatively defined by a turbine wheel and a turbine housing. The first compressor wheel, the rotor, the second compressor wheel, and the turbine wheel are fixed to a shaft to rotate as a unit relative to the first compressor housing, the stator, the second compressor housing, and the turbine housing. The first compressor stage is configured to compress an inlet fluid stream and direct a low pressure fluid stream toward the second compressor stage. The second compressor stage is configured to compress the low pressure fluid stream and direct a high pressure fluid stream toward the fuel cell stack. Additionally, the turbine wheel is configured to be driven in rotation by an exhaust stream from the fuel cell stack. Also, the turbine wheel is fixed on the shaft in a back-to-back arrangement with the second compressor wheel.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a fuel cell system with a charging device having multiple compression stages as well as a turbine section. In a rotating group of the charging device, a turbine wheel of the turbine section may be arranged in a back-to-back configuration with the compressor wheel of one of the compressor stages.

Figure 1:
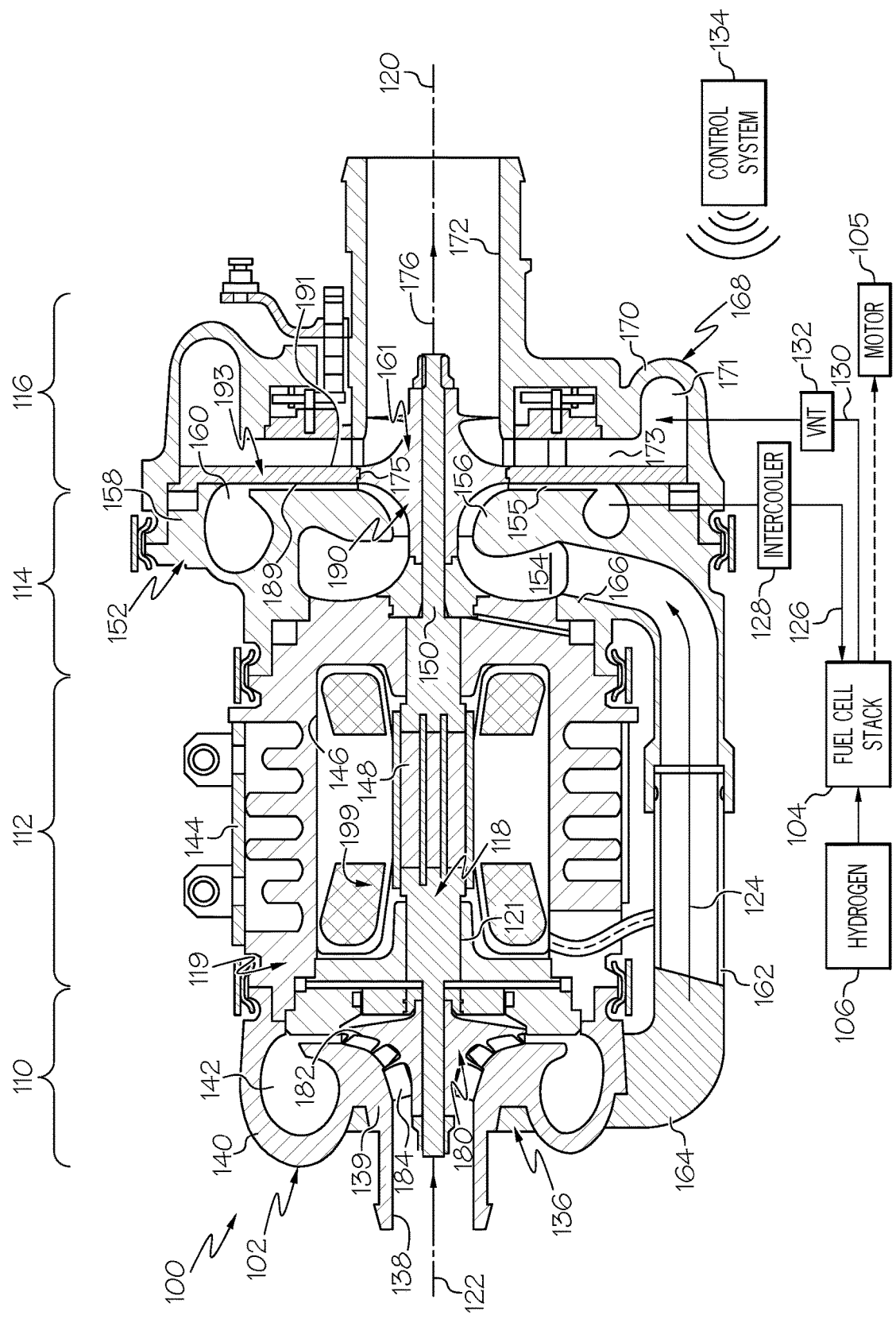
FIG. 1 is a schematic view of a fuel cell system, which includes a charging device according to example embodiments of the present disclosure.

FIG. 1 is a schematic view of a fuel cell system 100 with an example charging device 102 of the present disclosure. In some embodiments, the fuel cell system 100 may be included in a vehicle, such as a car, truck, sport utility vehicle, van, motorcycle, etc. However, it will be appreciated that the fuel cell system 100 may be configured for a different use without departing from the scope of the present disclosure.

The fuel cell system 100 may include a fuel cell stack 104 containing a plurality of fuel cells. Hydrogen may be supplied to the fuel cell stack 104 from a tank 106, and oxygen may be supplied to the fuel cell stack 104 to generate electricity by a known chemical reaction. The fuel cell stack 104 may generate electricity for an electrical device, such as an electric motor 105. As stated, the fuel cell system 100 may be included in a vehicle; therefore, in some embodiments, the electric motor 105 may convert the electrical power to mechanical power to drive and rotate an axle (and, thus, one or more wheels) of the vehicle.

Oxygen may be provided to the fuel cell stack 104, at least in part, by the charging device 102. As will be discussed, the charging device 102 may compress air as it flows toward the fuel cell stack 104 for boosting the operating efficiency of the fuel cell system 100.

The charging device 102 may be configured as a multi-stage fuel cell compressor. As shown in FIG. 1, the charging device 102 may generally include a rotating group 118 and a housing 119. The rotating group 118 may include a shaft 150 and various other components that are fixedly supported on the shaft 150 for rotation within the housing 119 by a bearing 121, such as a plain bearing, an air bearing, and/or an oil-less bearing.

The rotating group 118 and the housing 119 may cooperate to define a first compressor stage 110, a motor section 112, a second compressor stage 114, and a turbine section 116 of the charging device 102. In some embodiments, the first compressor stage 110 may be referred to as a "low pressure compressor stage" and the second compressor stage 114 may be referred to as a "high pressure compressor stage" for reasons that will become apparent. As will be discussed in detail below, the motor section 112 may include a motor 199 that includes a stator 146 and a rotor 148 and that drives and rotates the rotating group 118 about an axis 120. Accordingly, an inlet airstream (represented by arrow 122) may be compressed by the first compressor stage 110 (i.e., the low pressure compressor stage). A low pressure airstream (represented by arrow 124) may be directed to the second compressor stage 114 (i.e., the high pressure compressor stage) for further compression. A high pressure airstream (represented by arrow 126) from the second compressor stage 114 may be directed to an intercooler 128 and then to the fuel cell stack 104. Accordingly, the stack 104 may generate electricity from the hydrogen provided from the tank 106 and the oxygen provided in the high pressure airstream 126.

Furthermore, an exhaust gas stream (represented by arrow 130) from the fuel cell stack 104 may be directed back to the turbine section 116 of the charging device 102. The exhaust gas stream 130 may drive and rotate the rotating group 118 at the turbine section 116 to assist the motor section 112. In some embodiments, the exhaust gas stream 130 may be directed toward the turbine section 116 by a variable nozzle device 132 (i.e., a variable nozzle turbine or VNT).

Various components of the fuel cell system 100 may be controlled by a control system 134. The control system 134 may be a computerized system with a processor, various sensors, and other components for electrically controlling operation of the fuel cell stack 104, the motor section 112, the motor 105, the variable nozzle device 132, and/or other features of the system 100. In some embodiments, the control system 134 may define or may be part of the electrical control unit (ECU) of a vehicle.

It will be appreciated that the multi-stage compressor of the charging device 102 allows for higher pressure ratios during operation. Also, the turbine section 116 provides energy recovery for the charging device 102.

Moreover, as will be discussed in detail, the turbine section 116 may be disposed in close proximity to at least one of the compressor stages. As shown, for example in the illustrated embodiments, one or more components of the turbine section 116 may be disposed in a back-to-back arrangement with components of the second compressor stage 114. (However, it will be appreciated that the turbine section 116 may be disposed in a back-to-back arrangement with components of the first compressor stage 110 without departing from the scope of the present disclosure.)

The charging device 102 will now be discussed in greater detail according to example embodiments. The housing 119 will be discussed with reference to FIG. 1, and the rotating group 118 will be discussed with reference to FIGS. 1 and 2.

As shown, the housing 119 may include a motor housing 144 that is hollow and cylindrical. The motor housing 144 may extend lengthwise along the axis 120, between the first compressor stage 110 and the second compressor stage 114. The motor housing 144 may house the stator 146, which may be fixed inside the motor housing 144. The rotor 148 may be fixed on the shaft 150 of the rotating group 118 and may be received within the stator 146.

Moreover, the housing 119 may include a first compressor housing member 136, which defines an axial inlet 138, a shroud member 139, and a volute member 140. The volute member 140 may be fixedly attached on one end of the motor housing 144 or other portions of the motor section 112. The axial inlet 138 may be straight and centered on the axis 120. The shroud member 139 may be inversely shaped according to components of the rotating group 118. The volute member 140 may define a volute passage 142 therein that extends about the axis 120. As will be discussed, the inlet airstream 122 may flow into the inlet 138, flow past the shroud member 139, and flow into the volute passage 142 during operation of the charging device 102.

Furthermore, the housing 119 may include a second compressor housing member 152, which defines a radial inlet 154, a shroud member 156, and a volute member 158. The second compressor housing member 152 may be fixedly attached to the motor housing 144 or other portions of the motor section 112, on an opposite end from the first compressor housing member 136. The radial inlet 154 may extend in a downstream direction radially toward the axis 120 and may become gradually smaller in cross sectional area. The inlet 154 may also turn in a direction that is substantially parallel to the axis 120 and may fluidly connect to a diffuser section 155. The shroud member 156 may be contoured and shaped according to components of the rotating group 118. The volute member 158 may define a volute passage 160 therein that extends about the axis 120. As will be discussed, the low pressure airstream 124 may flow into the inlet 154, flow past the shroud member 156, and flow into the volute passage 160. From the volute passage 160, the high pressure airstream 126 may flow to the intercooler 128 and, then, to the fuel cell stack 104.

In some embodiments, the charging device 102 may also include an interstage duct 162. The interstage duct 162 may be elongate with a first end 164 that is connected to the volute member 140 of the first compressor stage 110 and a second end 166 that is connected to the radial inlet 154 of the second compressor stage 114. Accordingly, the interstage duct 162 may direct flow of the low pressure airstream 124 from the first compressor stage 110, across the motor housing 144, and to the second compressor stage 114.

Moreover, the housing 119 of the charging device 102 may include a turbine housing member 168. The turbine housing member 168 may be fixed to the second compressor housing member 152 on an end that is opposite the motor section 112. The turbine housing member 168 may define a volute inlet member 170 with a circumferential passage 171 and a radial passage 173 formed therein. The circumferential passage 171 may receive the exhaust stream 130 from the fuel cell stack 104, and the circumferential passage 171 may direct the stream radially inward along the radial passage 173 toward an axial outlet 172 of the turbine housing member 168. As mentioned above, the rotating group 118 may be driven in rotation by the exhaust stream 130 at the turbine section 116. A resultant exhaust stream 176 may exit the charging device 102 via the axial outlet 172.

In some embodiments, the housing 119 may further include a divider member 193. The divider member 193 may be a relatively flat plate with a first surface 191 and an opposing second surface 189. The divider member 193 may separate the turbine section 116 and the second compressor stage 114. In other words, the divider member 193 may define a boundary for both the turbine section 116 and the second compressor stage 114. In some embodiments, the divider member 193 may be fixed and sandwiched between the turbine housing member 168 and the second compressor housing member 152. Also, the first surface 191 may define a portion of the radial passage 173 and the circumferential passage 171 of the turbine section 116. Furthermore, the second surface 189 may define a portion of diffuser section 155 and the volute passage 160.

It will be understood that the housing 119 and/or other portions of the charging device 102 may include a number of additional components, which are not described in detail. For example, the housing 119 may include a number of fasteners, fluid seals, heat shielding, and/or other components for maintaining efficient and effective operations of the charging device 102.

Figure 2:
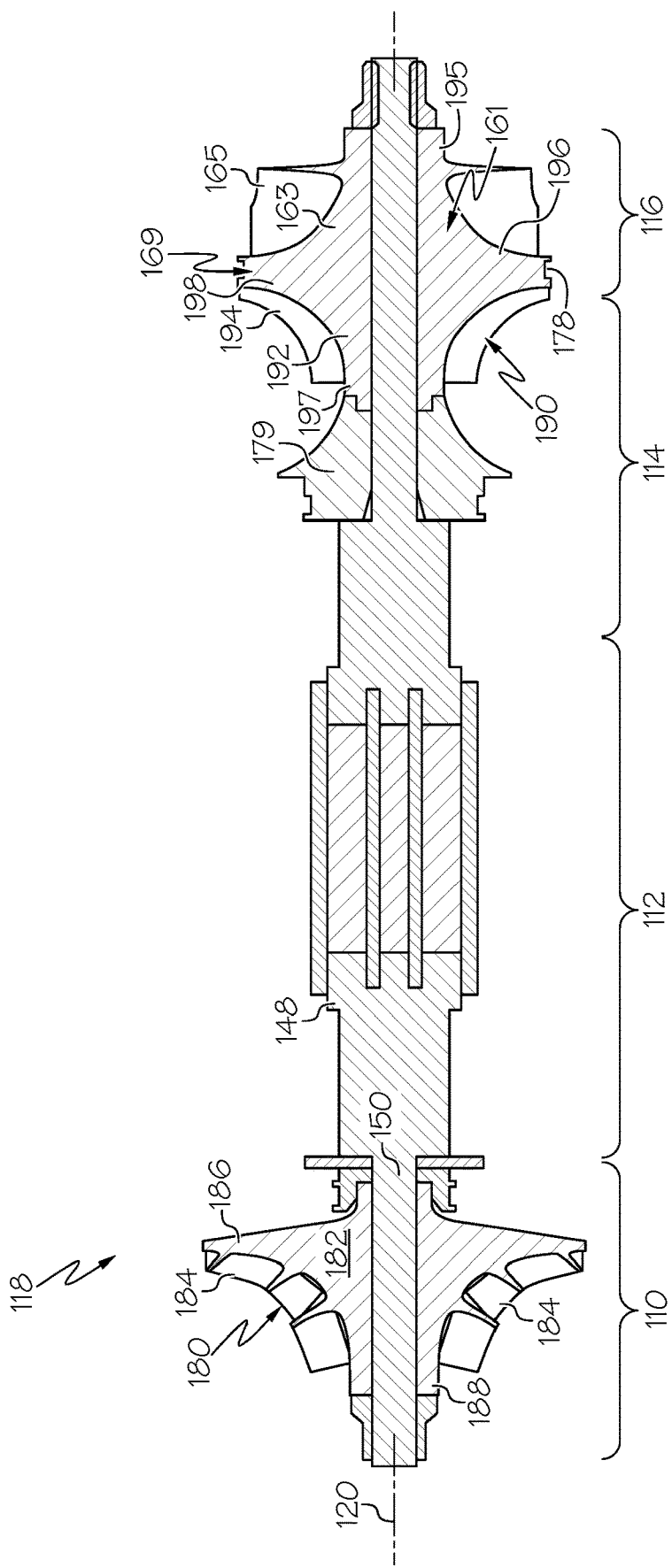
FIG. 2 is a section view of a rotating group of the charging device of the fuel system of FIG. 1.

Referring now to FIGS. 1 and 2, the rotating group 118 will be discussed in greater detail. As shown, the rotating group 118 may include a first compressor wheel 180. The first compressor wheel 180 may include a support structure 182 and a plurality of blades 184. As shown in FIG. 2, the support structure 182 may include a first end 186 and a second end 188 that are spaced apart along the axis 120. The support structure 182 may gradually taper outward radially along the axis 120 from the smaller second end 188 to the larger disc-like first end 186. The blades 184 may be relatively thin members that project from the support structure 182. The blades 184 may project radially away from the axis 120. The blades 184 may also extend helically about the axis 120. The first compressor wheel 180 may be fixed to one terminal end of the shaft 150, in the first compressor stage 110, with the second end 188 and the blades 184 facing in the upstream direction of the axial inlet 138. The first compressor wheel 180 may be substantially centered on the axis 120. Also, as shown in FIG. 1, the first compressor wheel 180 and the shroud member 139 may cooperate to at least partly define the first compressor stage 110. Thus, during operation of the charging device 102, the first compressor wheel 180 may rotate relative to the shroud member 139, compressing the inlet airstream 122 and moving the low pressure airstream 124 toward the second compressor stage 114 via the interstage duct 162.

Additionally, the rotating group 118 may include an inlet spacer 179 and a second compressor wheel 190. The second compressor wheel 190 may include a support structure 192 and a plurality of blades 194. The support structure 192 and the blades 194 may share one or more common features with the support structure 182 and blades 184, respectively, of the first compressor wheel 180 as discussed above. However, the support structure 192 and blades 194 may have different sizes, dimensions, arrangements, etc. as compared with the support structure 182 and blades 184. As shown, the support structure 192 may include a first end 198 (i.e., a back end) and a second end 197 that are spaced apart along the axis 120. The support structure 192 may gradually taper outward radially along the axis 120 from the smaller second end 197 to the larger first end 198. The blades 194 may extend radially from the axis 120 and may extend helically with respect to the axis 120.

The inlet spacer 179 and the second compressor wheel 190 may be fixed to the shaft 150 in the second compressor stage 114. The second compressor wheel 190 may be fixed to the shaft 150 with the second end 197 disposed between the motor section 112 and the first end 198. Also, in this position, the second compressor wheel 190 may be oriented with the blades 194 facing generally toward the motor section 112 and the first compressor wheel 180. The second compressor wheel 190 may be substantially centered on the axis 120. Also, as shown in FIG. 1, the second compressor wheel 190 and the shroud member 156 may cooperate to at least partly define the second compressor stage 114. Thus, during operation of the charging device 102, the inlet spacer 179 and the second compressor wheel 190 may rotate relative to the shroud member 156. The inlet spacer 179 may direct the airstream 124 toward the second compressor wheel 190, and the second compressor wheel 190 may compress the airstream 124 and move the high pressure airstream 126 toward the fuel cell stack 104.

Moreover, the rotating group 118 may include a turbine wheel 161. The turbine wheel 161 may include a support structure 163 and a plurality of blades 165. As shown, the support structure 163 may include a first end 196 (i.e., a back end) and a second end 195 that are spaced apart along the axis 120. The support structure 163 may gradually taper outward radially along the axis 120 from the smaller second end 195 to the larger first end 196. The blades 165 may extend radially from the axis 120 and may extend helically with respect to the axis 120.

The support structure 163 may be fixedly attached to the support structure 192 of the second compressor wheel 190. The turbine wheel 161 may be fixed to the shaft 150 in the turbine section 116. The turbine wheel 161 may be fixed to the shaft 150 with the first end 196 of the turbine wheel 161 disposed between the first end 198 of the second compressor wheel 190 and the second end 195 of the turbine wheel 161. Also, in this position, the turbine wheel 161 may be oriented with the blades 165 generally facing in an opposite direction and away from the blades 194 of the second compressor wheel 190 (with respect to the axis 120). Moreover, the first end 196 of the turbine wheel 161 may be disposed in close proximity and, in some embodiments, immediately adjacent the first end 198 of the second compressor wheel 190. Accordingly, the turbine wheel 161 and the second compressor wheel 190 may be disposed in a back-to-back arrangement.

Also, in some embodiments represented in FIGS. 1 and 2, the turbine wheel 161 and the second compressor wheel 190 may be integrally attached so as to be a monolithic, unitary, and one-piece member 169. In some embodiments, the turbine wheel 161 and the second compressor wheel 190 may be formed simultaneously and integrally attached together (i.e., inseparable without significant damage to one or both). For example, the one-piece member 169 may be formed via a casting process, via an additive manufacturing (3-D printing) process, or another suitable process.

However, it will be appreciated that the turbine wheel 161 and the second compressor wheel 190 may be separate and independent pieces without departing from the scope of the present disclosure. For example, the turbine wheel 161 and the second compressor wheel 190 may be attached by fasteners, press fit, etc. In some embodiments, the turbine wheel 161 and second compressor wheel 190 may be removably attached to each other and to the shaft 150 such that these parts may be detached, for example, for repair and replacement.

Additionally, it will be appreciated that the turbine wheel 161 and the second compressor wheel 190 may be detached from each other without departing from the scope of the present disclosure. Both may be fixed to the shaft 150 in the back-to-back arrangement represented in FIGS. 1 and 2; however, there may be no direct attachment between the turbine wheel 161 and the second compressor wheel 190. The detached turbine wheel 161 and second compressor wheel 190 may abuttingly contact each other, or there may be a gap defined between the first end 198 of the second compressor wheel 190 and the first end 196 of the turbine wheel 161.

As shown in FIG. 2, the one-pieced member 169 of the turbine wheel 161 and the second compressor wheel 190 may be fixed to the terminal end of the shaft 150, opposite that of the first compressor wheel 180. In some embodiments, the divider member 193 may include an aperture 175 that receives the one-pieced member 169. The inner rim of the aperture 175 may be received in a recess 178 of the one-piece member 169 between the first end 198 of the second compressor wheel 190 and the turbine wheel 161. There may be a seal or other member for substantially sealing off this interface to inhibit leakage between the second compressor stage 114 and the turbine section 116.

Accordingly, the turbine wheel 161 may be disposed within the turbine housing member 168 to define the turbine section 116 of the charging device 102. Also, the second compressor wheel 190 may be disposed within the second compressor housing member 152. The second compressor wheel 190 may be interposed between the turbine wheel 161 and the first compressor wheel 180 with respect to the axis 120. Furthermore, the rotor 148 may be interposed between the second compressor wheel 190 and the first compressor wheel 180. The blades 194 of the second compressor wheel 190 may face toward the first side 186 (i.e., the back side) of the first compressor wheel 180. Also, the blades 165 of the turbine wheel 161 may face downstream into the axial outlet 172.

The circumferential passage 171 and the radial passage 173 of the turbine section 116 may receive the exhaust stream 130 from the fuel cell stack 104. The turbine wheel 161 may be driven in rotation by the exhaust stream 130 to assist the motor 199 in rotating the shaft 150. The exhaust stream 176 may exit the charging device 102 via the axial outlet 172.

Additionally, the turbine wheel 161 may be configured as a turbine expander (i.e., turbo-expander, expansion turbine, etc.). The turbine wheel 161 may expand the gas of the exhaust stream 130 to produce work for assisting the motor 199 in driving the compressor stages 110, 114.

The efficiency of the turbine section 116 may be increased with higher temperatures in areas proximate the turbine wheel 161. Also, by comparison, temperatures proximate the turbine wheel 161 may be substantially lower than adjacent areas of the charging device 102. Thus, in some embodiments, the turbine wheel 161 may absorb heat from the adjacent areas of the charging device 102. For example, the turbine wheel 161, the inlet into the turbine section 116, etc. may absorb heat from the second compressor wheel 190, the shroud member 156, and/or the volute member 158 of the second compressor stage 114. Thus, temperatures proximate the turbine wheel 161 may be increased for improved efficiency of the turbine section 116. Also, temperatures proximate the second compressor wheel 190 may be reduced, which may allow a lighter-duty intercooler 128 to be used.

Accordingly, the charging device 102 may provide improved operating efficiency for the fuel cell system 100. The charging device 102 may also be relatively compact. The back-to-back arrangement of the second compressor wheel 190 and the turbine wheel 161 may reduce the amount of overhanging mass on the rotating group 118. This may improve dynamic performance of the rotating group 118 and enable subcritical operation. Accordingly, the rotating group 118 may be simpler to balance, and noise may be reduced. These factors may also contribute to a smaller package size and reductions in overall costs for the fuel cell system 100.

Figure 3:
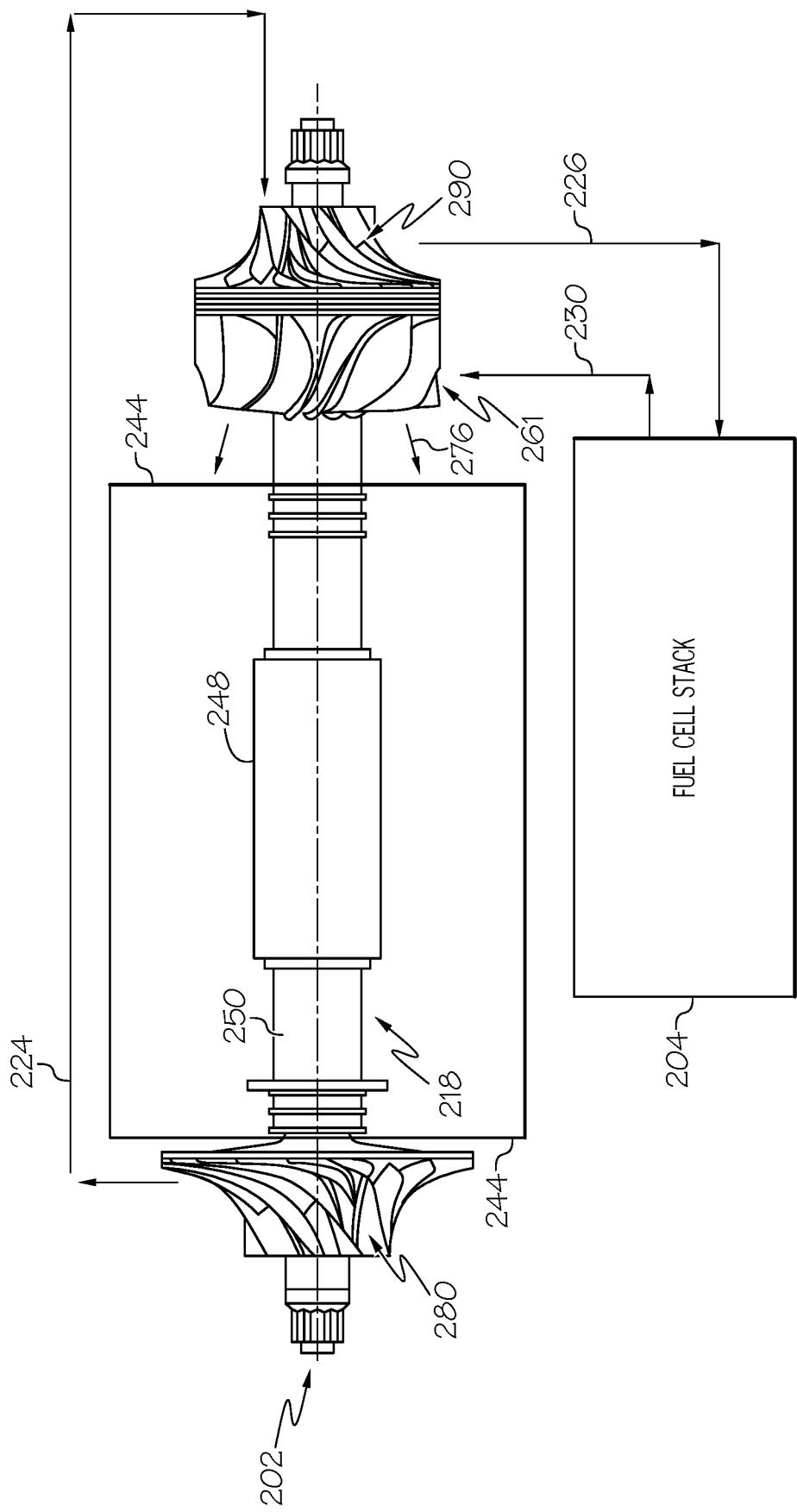
FIG. 3 is a schematic view of the fuel cell system with a rotating group of the charging device shown according to additional embodiments of the present disclosure.

Referring now to FIG. 3, the charging device 202 is illustrated according to additional embodiments of the present disclosure. The charging device 202 may be substantially similar to the system 100 of FIGS. 1 and 2, except as noted below. Components that correspond to those of FIGS. 1 and 2 are indicated with corresponding reference numbers increased by 100.

As shown, the charging device 202 include a rotating group 218 with the shaft 250, the first compressor wheel 280, the rotor 248, the second compressor wheel 290, and the turbine wheel 261. The turbine wheel 261 and the second compressor wheel 290 may be disposed in a back-to-back arrangement, like the embodiments discussed above. However, the turbine wheel 261 may be disposed between the first compressor wheel 280 and the second compressor wheel 290 along the axis 220.

In operation, the low pressure airstream 224 may flow (through an interstage duct) to the second compressor wheel 290. The high pressure airstream 226 may flow from the second compressor wheel 290 to the fuel cell stack 204. The exhaust gas stream 230 may then flow to the turbine wheel 261 to drive the turbine wheel in rotation. Next, the exhaust stream 276 may flow axially toward the motor housing 244 and then out of the charging device 202.

The orientation of the back-to-back turbine wheel/second compressor wheel may be configured according to various considerations. For example, one orientation may provide better balancing of thrust forces along the axis of the shaft of the rotating group. Accordingly, loads on the bearings may be reduced. Furthermore, the orientation may be more compact and/or may provide better packaging, ducting, etc. For example, the embodiment of FIGS. 1 and 2 may provide more space for the variable nozzle device 132 and/or for other features.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:
1. A multi-stage charging device comprising:
a shaft that is supported for rotation about an axis;

a first compressor wheel and a first compressor housing that cooperate to define a first compressor stage, the first compressor wheel being fixed on the shaft;

a second compressor housing that partly defines a second compressor stage configured to receive a compressed fluid stream from the first compressor stage;

a turbine housing that partly defines a turbine section;

a plural wheel member that is fixed on the shaft, the plural wheel member having a second compressor wheel and a turbine wheel arranged back-to-back and sharing a common outer radial edge, the second compressor wheel supported in the second compressor housing and the turbine wheel supported in the turbine housing;

the plural wheel member being one-piece, unitary, and formed of a thermally conductive material that thermally couples the second compressor stage and the turbine section and defines a thermal path through which the turbine section absorbs heat from the second compressor stage; and an air bearing system that supports the shaft, the first compressor wheel, and the plural wheel member for rotation as a unit relative to the first compressor housing, the second compressor housing, and the turbine housing, the air bearing system disposed axially between the first compressor wheel and the plural wheel member.

2. The charging device of claim 1, wherein the second compressor wheel is disposed between the first compressor wheel and the turbine wheel along the axis.

3. The charging device of claim 1, wherein the turbine wheel is disposed between the first compressor wheel and the second compressor wheel along the axis.

4. The charging device of claim 1,
further comprising an interstage duct that directs flow of the compressed fluid stream from the first compressor wheel to the second compressor wheel.

5. The charging device of claim 1, wherein the turbine wheel is configured as a turbine expander that receives exhaust from a fuel cell.

6. The charging device of claim 1, further comprising a motor that is disposed between the plural wheel member and the first compressor wheel; and
wherein the turbine wheel is configured to be driven in rotation by exhaust from a fuel cell to assist the motor.

7. The charging device of claim 1, further comprising a divider plate with a first face and a second face facing in opposite axial directions along the axis, wherein the divider plate includes an aperture that receives the plural wheel member;
wherein the divider plate separates the second compressor stage and the turbine section of the charging device; and
wherein the first face of the divider plate cooperates with the turbine housing to define a radially-extending inlet of the turbine section, and wherein the second face of the divider plate cooperates with the second compressor housing to define a radially-extending diffuser section of the second compressor stage.

8. A multi-stage charging device for a fuel cell system with a fuel cell stack, the charging device comprising:
a shaft that is supported for rotation about an axis;
a first compressor stage cooperatively defined by a first compressor wheel and a first compressor housing;
a motor section with a stator and a rotor;
a second compressor housing that partly defines a second compressor stage;
a turbine housing that partly defines a turbine section;

a plural wheel member that is fixed on the shaft, the plural wheel member having a second compressor wheel and a turbine wheel arranged back-to-back and sharing a common outer radial edge, the second compressor wheel supported in the second compressor housing and the turbine wheel supported in the turbine housing;

the first compressor wheel, the rotor, the second compressor wheel, and the turbine wheel fixed to the shaft to rotate as a unit relative to the first compressor housing, the stator, the second compressor housing, and the turbine housing;

the first compressor stage configured to compress an inlet fluid stream and direct a low pressure fluid stream toward the second compressor stage;

the second compressor stage configured to compress the low pressure fluid stream and direct a high pressure fluid stream toward the fuel cell stack;

the turbine wheel configured to be driven in rotation by an exhaust stream from the fuel cell stack;

the plural wheel member being one-piece, unitary, and formed of a thermally conductive material that thermally couples the second compressor stage and the turbine section and defines a thermal path through which the turbine section absorbs heat from the second compressor stage; and an air bearing system that supports the shaft, the first compressor wheel, and the plural wheel member for rotation as a unit relative to the first compressor housing, the second compressor housing, and the turbine housing, the air bearing system disposed axially between the first compressor wheel and the plural wheel member.

9. The charging device of claim 8, wherein the second compressor wheel is disposed between the first compressor wheel and the turbine wheel along the axis.

10. The charging device of claim 8, wherein the turbine wheel is disposed between the first compressor wheel and the second compressor wheel along the axis.

11. The charging device of claim 8, further comprising an interstage duct that directs flow of the low pressure fluid stream from the first compressor wheel to the second compressor wheel.

12. The charging device of claim 8, further comprising a divider plate with a first face and a second face that face in opposite axial directions along the axis, wherein the divider plate includes an aperture that receives the plural wheel member;
wherein the divider plate separates the second compressor stage and the turbine section of the charging device; and
wherein the first face of the divider plate cooperates with the turbine housing to define a radially-extending inlet of the turbine section, and wherein the second face of the divider plate cooperates with the second compressor housing to define a radially-extending diffuser section of the second compressor stage.

13. A fuel cell system comprising:
a shaft that is supported for rotation about an axis;
a first compressor wheel and a first compressor housing that cooperate to define a first compressor stage, the first compressor wheel being fixed on the shaft;
a second compressor housing that partly defines a second compressor stage;
a turbine housing that partly defines a turbine section;
a plural wheel member that is fixed on the shaft, the plural wheel member having a second compressor wheel and a turbine wheel arranged back-to-back and sharing a common outer radial edge, the second compressor wheel supported in the second compressor housing and the turbine wheel supported in the turbine housing;

a divider plate that receives the plural wheel member and that separates the turbine section from the second compressor stage;

the plural wheel member being one-piece, unitary, and formed of a thermally conductive material that thermally couples the second compressor stage and the turbine section and defines a thermal path through which the turbine section absorbs heat from the second compressor stage; and an air bearing system that supports the shaft, the first compressor wheel, and the plural wheel member for rotation as a unit relative to the first compressor housing, the second compressor housing, and the turbine housing, the air bearing system disposed axially between the first compressor wheel and the plural wheel member.

14. The multi-stage charging device of claim 1, further comprising an interstage duct;

further comprising an inlet spacer that is fixed to the shaft;

wherein the interstage duct is configured to direct flow of the compressed fluid stream from the first compressor wheel radially toward the inlet spacer with respect to the axis, and wherein the inlet spacer is configured to re-direct the compressed fluid stream axially toward the second compressor wheel.

15. The multi-stage charging device of claim 8, further comprising an interstage duct;

further comprising an inlet spacer that is fixed to the shaft;

wherein the interstage duct is configured to direct flow of the compressed fluid stream from the first compressor wheel radially toward the inlet spacer with respect to the axis, and wherein the inlet spacer is configured to re-direct the compressed fluid stream axially toward the second compressor wheel.

16. The fuel cell system of claim 13, further comprising an interstage duct;

further comprising an inlet spacer that is fixed to the shaft;

wherein the interstage duct is configured to direct flow of the compressed fluid stream from the first compressor wheel radially toward the inlet spacer with respect to the axis, and wherein the inlet spacer is configured to re-direct the compressed fluid stream axially toward the second compressor wheel.

* * * * *